United States Patent Office 3,646,073
Patented Feb. 29, 1972

3,646,073
PREPARATION OF 2,6-DI-TERT-HYDROCARBYL-BENZOQUINONES
John C. Wollensak, Bloomfield Hills, Mich., assignor to Ethyl Corporation, New York, N.Y.
No Drawing. Filed Oct. 2, 1969, Ser. No. 863,353
Int. Cl. C07c 49/64
U.S. Cl. 260—396 R
4 Claims

ABSTRACT OF THE DISCLOSURE

Air oxidation of 2,4,6-tri-tert-hydrocarbylphenols forms a reaction mixture containing 2,6 - di-tert-hydrocarbyl benzoquinones. The mixture is acidified with a strong mineral acid such as phosphoric acid and then distilled to recover the benzoquinone in improved yield and purity.

BACKGROUND

A process for making 2,6-di-tert-hydrocarbyl benzoquinones is disclosed in U.S. 3,213,114. This process results in excellent yields of benzoquinone. When the product is distilled from the reaction mixture a small amount of an impurity is often found in the product. This necessitates a fractional distillation if a high purity product is required.

SUMMARY

It has now been found that the process described in U.S. 3,213,114 can be improved by acidifying the reaction mixture after the oxidation step with a strong mineral acid and then distilling the benzoquinone from the acidified reaction mixture. By this improvement, an impurity frequently found in the product is substantially eliminated. From this, it can be seen that the main object of this invention is to provide an improvement in the benzoquinone process described in U.S. 3,213,114 whereby a product having a higher purity is obtained.

DESCRIPTION OF THE PREFERRED EMBODIMENT

A preferred embodiment of this invention is an improvement in a process for making benzoquinones, said process comprising contacting a phenol having the formula:

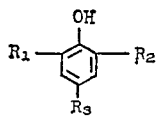

wherein $R_1$, $R_2$ and $R_3$ are hydrocarbon radicals containing a tertiary carbon atom such that said tertiary carbon atom is bonded directly to the phenol ring, with an oxygen-containing gas and an oxidation catalyst to form a benzoquinone having the formula:

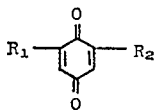

The improvement comprises the addition to the reaction mixture after completing the oxidation of a strong mineral acid in an amount sufficient to acidify the reaction mixture and then distilling the benzoquinone product from the acidified reaction mixture.

The process of making the benzoquinones is described in detail in U.S. 3,213,114, issued Oct. 19, 1965, the disclosure of which is incorporated herein by reference. In essence, a solution of 2,4,6-trihydrocarbylphenol is oxidized by an oxygen-containing gas (air) in the presence of an oxidation catalyst. Examples of phenols that can be converted in the process included 2,4,6-tri-tert-butylphenol,
2,4-di-tert-amyl-6-tert-butylphenol,
2,4,6-tri(1,1,3,3-tetramethyl-n-butyl)phenol,
2-tert-butyl-4,6-di-tert-octylphenol,
2,6-di-tert-butyl-4-(1-ethyl-1-n-propyl-n-amyl)phenol,
2,4,6-tri-tert-octylphenol,
2,4,6-tri-(1,1-dimethyl-n-butyl)phenol,
2,6-di-tert-amyl-4-tert-butylphenol,
2,4,6-tri-(1-ethyl-1-methyl-n-propyl)phenol,
2,4-di-tert-butyl-6-(1,1,3,3-tetramethyl-n-amyl)phenol,
2-(α,α-dimethylbenzyl)-4,6-di-(1,1-dimethyl-n-nonyl) phenol,
4-tert-butyl-2,6-di-(α,α-dimethylbenzyl)phenol,
2-(α,α-diethylbenzyl)-4,6-di-(1,1-dimethyl-n-amyl) phenol,
2,4,6-tri-(1-ethyl-1-methyl-n-nonyl)phenol,
2,4,6-tri-(α,α-dimethylbenzylphenol),
2,6-di-tert-butyl-4-(α,α-dimethylbenzyl)phenol,
2,6-di-tert-butyl-4-(α,α-diethylbenzyl)phenol and
2,4,6-tri-(α,α-diethyl-p-methylbenzyl)phenol.

The oxidation catalyst includes such catalysts as platinum sponge, platinum black, colloidal platinum, palladium black, osmium, tellurium, colloidal tellurium, colloidal iridium, gold, silver, copper, gilded asbestos, silver asbestos, copper asbestos, platinized asbestos, reduced cobalt, manganese butyl aluminum turnings, reduced nickel, carbon, metallic oxides such as copper oxide, nickel oxide, cobalt oxide, ferric oxide, chromium sesquioxide, iron sesquioxide, valladium pantoxide, cerium oxide, osmium peroxide, metallic chlorides such as aluminum chloride and copper chloride, manganous salts such as manganese chloride, manganese acetate, manganese butyrate, manganese benzoate and manganese borate, cobalt borate, copper salts such as copper naphthenate, cuprous chloride complexes of such amines as pyridine, N,N,N′,N′-tetramethylethylenediamine, phenylenediamine, diethylamine and n-butylamine can be used.

After the oxidation is complete the benzoquinone can be recovered by distillation from the reaction mixture. The reaction mixture sometimes contains a compound believed to have the structure:

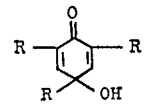

This compound is designated herein as "Compound X." In a simple distillation this compound co-distills with the benzoquinone and the result is that the distilled product is generally found to contain from 5–10 percent of the impurity. In the improved process a strong mineral acid is added prior to distillation which causes Compound X to decompose, forming additional benzoquinone and substantially eliminating Compound X from the distillate.

The preferred acids are the strong mineral acids such as hypophosphoric acid, meta-phosphoric acid, orthophosphoric acid, pyrophosphoric acid, sulfuric acid, sulfurous acid, hydrochloric acid, nitric acid, and the like. Of these, the most preferred acids are the phosphoric acids, especially orthophosphoric acid.

The amount of acid added should be sufficient to acidify the reaction mixture. Up to about 10 weight percent, based on the starting phenol, can be used. A preferred addition range is from about 0.001–10 weight percent, based on the starting phenol. The manner in which the improvement in the benzoquinone process is carried out in illustrated by the following example. All parts are by weight unless otherwise specified.

EXAMPLE

In a pressure reaction vessel was placed 376.3 parts of a crude phenol mixture containing about 86 weight percent 2,4,6-tri-tert-butylphenol. This mixture was obtained by distilling the more volatile phenols from an alkylation mixture made following the process of U.S. 2,831,898 and containing 10 percent o-tert-butylphenol, 75 percent 2,6-di-tert-butylphenol and 15 percent 2,4,6-tri-tert-butylphenol. Following this, 374.5 parts of toluene, 1.5 parts of cuprous oxide and 10 parts of water were added. The vessel was sealed and heated to 123° C. It was then pressurized with nitrogen to 300 p.s.i.g. While holding at 119-121° C., air was passed through the liquid phase at a rate of about 0.04 cubic feet per minute for a period of about 4 hours. Spent air was vented from the vessel at a controlled rate such that the internal pressure remained at 325-330 p.s.i.g. Following this, the vessel was cooled and discharged into a wash vessel where it was washed first with 5 percent adqueous sodium carbonate and then with water. It was divided into two equal parts which were separately distilled as follows.

DISTILLATION WITHOUT ACID

The first part was subjected to a simple vacuum distillation without adding any acid. The distillation was carried out at 20 mm. Hg. After removing toluene solvent, the product 2,6-di-tert-butyl-p-benzoquinone was distilled out. Analysis by gas chromatography showed the distillate to contain:

|  | Percent |
|---|---|
| 2,6-di-tert - butylbenzoquinone | 84.0 |
| Compound X | 5.2 |
| 2,4,6 - tri - tert - butylphenol | 2.9 |
| Unkown composition | Balance |

DISTILLATION WITH MINERAL ACID

To the second equal portion was added 2.7 parts of ortho-phosphoric acid. This was then distilled under vacuum in the same manner as the first portion. Anaylsis of the product showed it to contain:

|  | Percent |
|---|---|
| 2,6 - di - tert - butylbenzoquinone | 87.5 |
| Compound X | 0.0 |
| 2,4,6 - tri -tert - butylphenol | 2.5 |
| Unkown composition | Balance |

In the above example any of the other strong mineral acids may be employed with good results. As the results show, the addition of the mineral acid, after oxidation but prior to distillation, completely eliminated Compound X from the distillate.

The benzoquinones made by this process are useful compounds. They are readily reduced using hydrogen and a Raney nickel catalyst to form the corresponding hydroquinone. These find use as antioxidants and chemical intermediates. For example, 2,6-di-tert-butylbenzoquinone is readily reduced to 2,6-di-tert-butylhydroquinone. This is an antioxidant itself or can be converted to other known antioxidants such as shown in U.S. 3,367,908 or U.S. 3,294,836.

I claim:
1. In a process for making benzoquinones, said process comprising contacting a phenol having the formula:

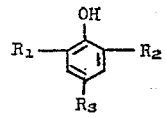

wherein $R_1$, $R_2$ and $R_3$ are hydrocarbon radicals containing a tertiary carbon atom such that said tertiary carbon atom is bonded directly to the phenol ring, with an oxygen-containing gas and an oxidation catalyst to form a benzoquinone having the formula:

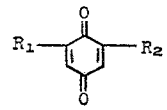

the improvement comprising adding to the reaction mixture, after completing the oxidation, a strong mineral acid in an amount sufficient to acidify the reaction mixture and distilling the benzoquinone product from the acidified reaction mixture.

2. A process of claim 1 wherein said acid is selected from the group consisting of phosphoric acid, phosphorus acid, sulfuric acid, sulfurous acid, hydrochloric acid and nitric acid.

3. A process of claim 2 wherein said acid is phosphoric acid.

4. A process of claim 3 wherein the amount of acid added is from about 0.001 to 10 weight percent based on the amount of said phenol.

References Cited
UNITED STATES PATENTS 3,213,114   10/1965   Braxton, Jr., et al. ____ 260—396

LORRAINE A. WEINBERGER, Primary Examiner

V. GARNER, Assistant Examiner

U.S. Cl. X.R.

260—624 E, 624 R